(12) United States Patent
Reyhanloo

(10) Patent No.: US 8,397,627 B2
(45) Date of Patent: Mar. 19, 2013

(54) BREWING DEVICE FOR COFFEE AND METHOD FOR PRODUCING A COFFEE BEVERAGE WITH A BREWING DEVICE

(75) Inventor: Shahryar Reyhanloo, Lohn-Ammansegg (CH)

(73) Assignee: Jura Elektroapparate AG, Niederbuchsiten (CH)

( * ) Notice: Subject to any disclaimer, the term of this patent is extended or adjusted under 35 U.S.C. 154(b) by 502 days.

(21) Appl. No.: 12/566,263

(22) Filed: Sep. 24, 2009

(65) Prior Publication Data
US 2010/0080877 A1 Apr. 1, 2010

(30) Foreign Application Priority Data
Sep. 26, 2008 (EP) .................................. 08405243

(51) Int. Cl.
*A47J 31/44* (2006.01)
*A23F 5/26* (2006.01)
(52) U.S. Cl. .................. 99/290; 99/323.1; 426/433
(58) Field of Classification Search ............... 99/275, 99/295, 302 R, 323.1, 290; 426/433; 261/78.1, 261/DIG. 16
See application file for complete search history.

(56) References Cited

U.S. PATENT DOCUMENTS
4,922,810 A * 5/1990 Siccardi ................. 99/323.1
5,768,981 A * 6/1998 Cicchetti ................. 99/453
2005/0189439 A1* 9/2005 Brouwer et al. ........... 239/461

FOREIGN PATENT DOCUMENTS
DE  40 37 366 A1  5/1992
EP  1 125 535 A2  8/2001
EP  1 743 554 A1  1/2007

OTHER PUBLICATIONS
European Search Report issued in connection with European Application No. 08405243.0 and completed on Feb. 18, 2009.
* cited by examiner Primary Examiner — Henry Yuen
Assistant Examiner — Jianying Atkisson
(74) Attorney, Agent, or Firm — Alston & Bird LLP

(57) ABSTRACT

The brewing device for coffee comprises a brewing unit for the brewing of coffee, a crema valve and a coffee outlet. The brewing unit, the crema valve and the coffee outlet are connected with one another so that in the brewing unit brewed coffee can be directed through the crema valve to the coffee outlet and the crema valve is designed so that the brewed coffee can be swirled through in a crema chamber of the crema valve and a crema is created. The brewing device comprises an injection device for injecting a gas into the crema chamber and a dosing device for dosing the quantity of the gas injected into the crema chamber. With each injection of the gas, a preset quantity of the gas is injected, the preset quantity of the gas being a parameter that can be changed.

19 Claims, 4 Drawing Sheets

BREWING DEVICE FOR COFFEE AND METHOD FOR PRODUCING A COFFEE BEVERAGE WITH A BREWING DEVICE

CROSS-REFERENCE TO RELATED APPLICATIONS

This application claims priority to and the benefit of the filing date of European Application No. 08405243.0, filed on Sep. 26, 2008, the contents of which are incorporated by reference herein.

FIELD OF THE INVENTION

The invention relates to a brewing device for coffee with a crema valve and a method for producing a coffee beverage with a brewing device.

BACKGROUND OF THE INVENTION

Today the crema makes up a substantial part of a coffee beverage. It binds a large part of the coffee aromas and thus substantially contributes to a good coffee flavour. Crema formation is influenced by various factors. For example by the quality of the brewed coffee and the type of brewing process.

From patent application EP 1 743 554 A1 a brewing device for a fully automatic coffee maker is known wherein a crema valve is connected with a brewing unit and a coffee outlet. The crema valve regulates the outflow of the coffee brewed in the brewing unit with a sealing plug and a compression spring. When the brewed coffee under high pressure is pressed through an opening on the sealing plug the coffee is swirled around and a very fine-pored froth is created which forms the crema. With this coffee maker the production of the crema can practically not be influenced by the user of the coffee maker. The coffee or the coffee beverage it contains in each case thus looks visually similar in each case.

With another known brewing device for coffee a mechanical throttling device is installed by means of which it is possible through mechanical adjustment of the throttling device to throttle the flow of the outflowing coffee at an end of the coffee outlet distant from the brewing chamber. Although this throttling has an influence on the quantity of crema produced, the influence is rather small however. Furthermore, the throttling has an influence on the coffee temperature and thus on the quality of the brewed coffee. There is furthermore the risk that the throttling device is clogged.

BRIEF SUMMARY OF THE INVENTION

The present invention is based on the object of avoiding the mentioned disadvantages and creating a brewing device for coffee and a method which makes it possible with simple means to vary the quantity of the respective crema produced within a wide range and to produce a multiplicity of crema versions with a variety of characteristics. Here, preferentially coffee aromas are to be bound and a crema produced which can be adapted to the respective coffee beverage, the cultural and/or regional customs and/or the personal taste of the user of the coffee maker.

The brewing device for coffee comprises a brewing unit for the brewing of coffee, a crema valve and a coffee outlet, wherein the brewing unit, the crema valve and the coffee outlet are connected with one another in such a manner that in the brewing unit brewed coffee can be guided through the crema valve to the coffee outlet and the crema valve is designed in such a manner that the brewed coffee can be swirled around in a crema chamber of the crema valve so that a crema is produced.

According to the invention the brewing device comprises an injection device for the injection of a gas into the crema chamber and a dosing device for the dosing of the quantity of the gas injected into the crema chamber which is designed in such a manner that upon every injection of the gas a preset quantity of the gas is injected each time, wherein the preset quantity of the gas is a parameter that can be varied.

With the help of the injection device a gas can be injected into the crema chamber, more preferably during a period of time in which the brewed coffee during the preparation of a coffee beverage flows into the crema chamber. The coffee which flows out of the brewing unit flows around the injected gas. The swirling-up of the coffee with the injected gas amplifies the formation of fine-pored froth, the crema, in the coffee. The quantity and the type of crema produced, more preferably the pore size of the crema, are influenced during the injection of the gas by a plurality of factors such as for example the quantity and the pressure of the injected gas.

According to the invention the quantity of the gas, which during the respective injection of the gas can be injected into the crema chamber by means of the injection device is a preset value in each case which however constitutes a variable parameter of the brewing device and can be changed if required. Dependent on the magnitude of this parameter, different quantities of the gas are injected into the crema chamber if applicable during successive gas injection. If the respective injection of the gas in each case takes place during the preparation of a coffee beverage it is achieved that different quantities of the gas are injected in different coffee beverages with the result that the quantity of the crema produced varies as a function of the quantity of the gas preset in each case. Different coffee beverages thus have different quantities of crema (dependent on the quantity of the injected gas).

In an embodiment of the brewing device the injection device comprises a hose pump, a piston pump, another pump or a pressure bottle and the injector gas is preferentially air, $CO_2$ or an flavouring. With a hose pump, a piston pump or another pump it is possible for example to adequately pressurize for example ambient air that it can be injected into the crema chamber. It is also possible to store the gas in a pressure bottle. Here, the pressure bottle can be filled with ambient air or for example with carbon dioxide $CO_2$. It is also conceivable to fill the pressure bottle with a flavouring and mix said flavouring with ambient air when injecting it into the crema chamber.

The dosing device allows control of the respective injecting of the gas and more preferably control of the quantity of the respective gas injected and allows the production of a predetermined quantity and type of crema on the coffee beverage.

In an embodiment the dosing device comprises a device for activating and/or deactivating the respective pump for the gas and/or, if the injection device comprises a controllable valve and/or a controllable throttling organ for controlling an injection of the gas, a device for adjusting the respective controllable valves and/or a device for adjusting the respective controllable throttling organ. With the device for activating and deactivating the respective pump or device for adjusting the controllable valve or the device for adjusting the respective controllable throttling organ the time and the quantity of the gas injected in the crema chamber can be determined.

In an embodiment the gas can be injected with low positive pressure. In the brewing chamber the coffee is brewed under a pressure after which it flows into the crema chamber through an opening in the crema valve. In order to prevent that the coffee flowing out of the brewing chamber flows into the injection device the gas has to be injected from the injection device into the crema chamber with at least the same amount of pressure. Because of the pressure expansion during the flow of the coffee from the brewing chamber into the crema chamber optimum swirling of the coffee and even mixing-through of the coffee with the gas occurs in addition, as a result of which a very fine pored froth is created.

In a further embodiment the quantity of the gas injected into the crema chamber (i.e. "preset quantity" of the gas which is injected from the injection device into the crema chamber) is programmable or adjustable and/or selectable within preset limits. Through the programming or setting the quantity and the type of crema can be preset for individual coffee beverages by the manufacturer of the coffee maker or a person skilled in the art. Dependent on regional or cultural preferences, a certain quantity and/or pore size of the crema can thus be preset. The user of the brewing device can select the quantity and pore size of the crema dependent on personal taste.

In order to program or set and/or select the "preset quantity" of the injected gas various means are suitable. It is possible for example that various values for the preset quantity of the injected gas or various quantities for a control parameter, which is equivalent to a preset quantity of the injected gas, preset in a control unit of the brewing device wherein a user can select one of the preset values (for example with the help of a keyboard) a touch-sensitive display, a rotary knob, a slide controller or with the help of another means which makes it possible to change a parameter which is representative for the preset quantity of the injected gas). It is also possible to store the value selected in the aforementioned manner in a memory, e.g. in a memory of the control unit of the brewing device wherein the control unit takes into account the stored value in controlling the brewing device and in the operation of the brewing device in each case brings about that a quantity of the gas corresponding to the stored value is injected into the crema chamber. Alternatively it is also possible that a user in each case enters a value for the preset quantity of the injected gas via a user interface (e.g. a keyboard, a speech control or another interface suitable for entering data) wherein the control of the brewing device suitably takes into account the respective value entered when controlling the brewing device.

In a further embodiment the injection device injects the gas with a nozzle into the crema chamber, wherein the nozzle is arranged in the crema chamber at an angle between 10° and 170° with respect to the flow direction of the coffee in the crema chamber and preferentially at an angle between 10° and 90° against the flow direction of the coffee in the crema chamber. Here, the nozzle is arranged on an inlet opening of the brewed coffee into the crema chamber. Through this arrangement of the nozzle the gas is directly injected into the swirled-up coffee. As a result, optimal mixing-through of the coffee with the gas takes place.

The method according to the invention for preparing coffee beverages serves to prepare a coffee beverage with a brewing device for coffee, wherein the brewing device comprises at least one brewing unit for the brewing of coffee, a crema valve and a coffee outlet and during the preparation of a coffee beverage brewed coffee from the brewing unit flows through the crema valve to the coffee outlet. The crema valve here is designed in such a manner that the brewed coffee is swirled through in a crema chamber of the crema valve so that a crema is created. In addition, gas is injected into the crema chamber wherein during the preparation of a first coffee beverage a first quantity of the gas is injected into the crema chamber and during the preparation of a second coffee beverage a second quantity of the gas is injected in the crema chamber, wherein the first quantity and the second quantity differ.

Through the dosing of the quantity of the injected gas the quantity and type of the crema which is created in the crema chamber during the swirling-through of the coffee flowing out of the brewing unit is predetermined and—dependent on the respective quantity of the gas—modified.

In an embodiment a point of time at which the respective gas injection commences and/or a duration of the respective gas injection and/or a pressure of the injected gas is modified. Through the presetting of the quantity and the pressure of the injected gas as a function of the time a profile is defined which (in terms of quantity and type) is assigned to a predetermined crema.

The changing of the various parameters, for example the quantity and/or the pressure of the gas injected into the crema chamber, changes the quantity and pore size of the crema created. For example more preferably the time or the duration of the gas injection during the outflow of the coffee from the brewing chamber has an effect on the quantity of the crema. By setting the respective parameters as function of the time, different profiles can be preset which—dependent on the selected coffee beverage, regional customs and/or personal taste—can be assigned to various crema quantities and different pore sizes. Various profiles can be saved in a memory (e.g. in an electronic memory and more preferably in a memory of a control unit of the respective brewing device).

In a preferred embodiment a positive pressure is created in the crema chamber through injecting gas into the crema chamber and residual water transported to the coffee outlet out of the crema chamber and/or a liquid line between the brewing unit and the coffee outlet following coffee drawing or a cleaning process.

By creating a positive pressure in the crema chamber the residual water which is present in the crema chamber or in the liquid line is directed to the coffee outlet. Through the removal of the residual water the crema valve, the liquid line and the coffee outlet are cleaned. Coffee residue is removed from the brewing device and the formation of lime through standing residual water is reduced. At the same time, the cooling-out of the residual water is prevented which is flushed out during the next coffee drawing and impairs the quality of this coffee beverage.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Further details of the invention and more preferably exemplary embodiments of the device according to the invention and the method according to the invention are explained in the following by means of the attached drawings. It shows:

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
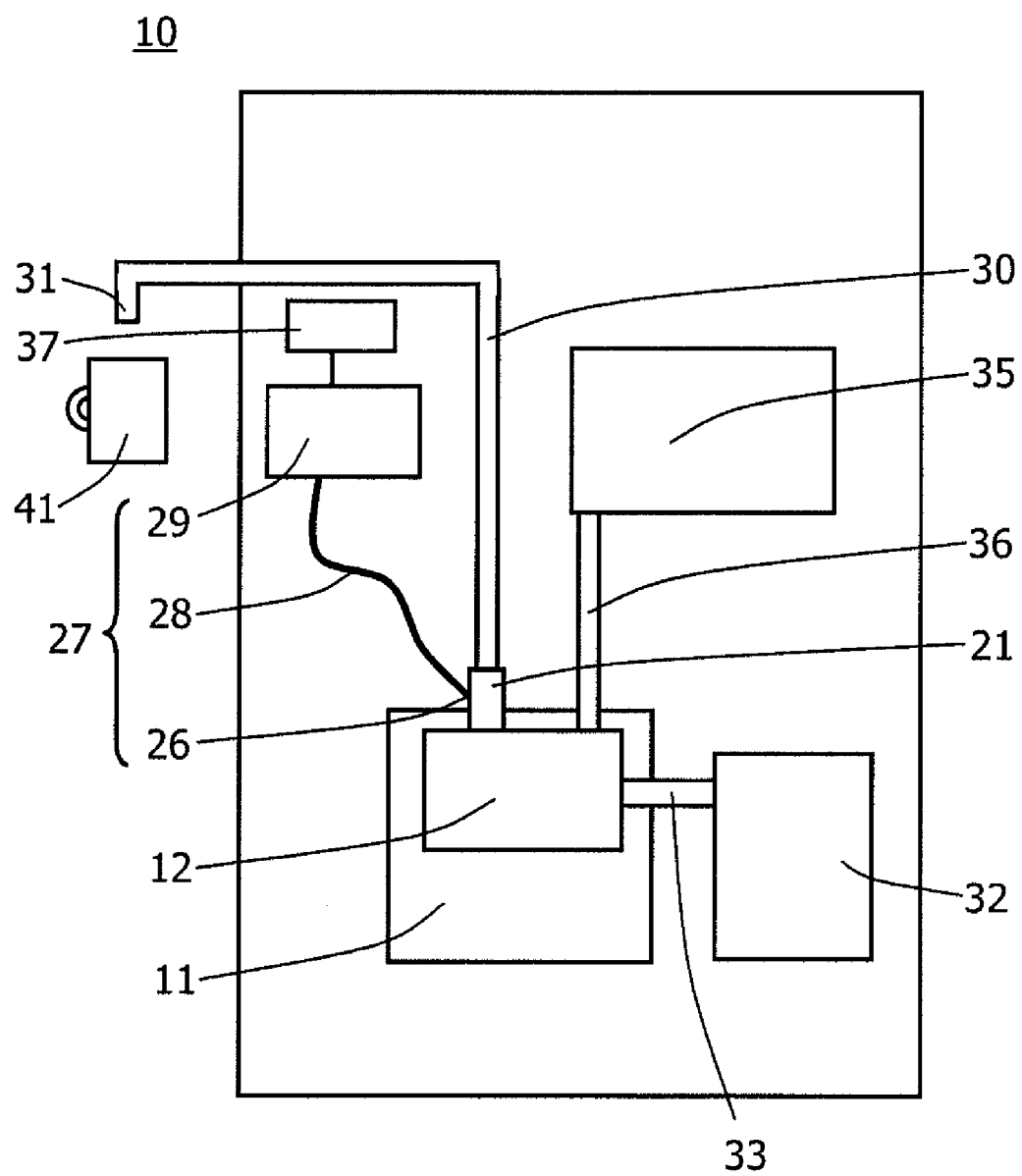
FIG. 1 is a schematic view of a brewing device with a brewing unit and a crema valve.

FIG. 1 shows a schematic view of a brewing device 10 for coffee according to the invention. The brewing device 10 in the view includes a container 35 in which raw coffee in any form, for example as coffee beans or ground, is stored. Through a coffee feed line 36 the ground coffee is directed into a brewing chamber 12 of a brewing unit 11. In the brewing chamber 12 the coffee is brewed with water from a water tank 32, which is likewise connected with the brewing chamber 12 via a water feed line 33. At the outflow of the brewing unit 11 is located a crema valve 21. The brewed coffee flows through the crema valve 21 and a liquid line 30 to the coffee outlet 31 into the cup 41. The crema valve 21 is designed in such a manner that the brewed coffee is swirled through in a crema chamber of the crema valve 21 during which a crema is created.

Furthermore, an injection device 27 for injecting a gas into the crema valve 21 is located in the brewing device 10. The injection device 27 comprises a pump 29, a gas hose 28 as well as a nozzle which terminates in the crema chamber. Gas from the pump 29 is directed through the gas hose 28 to the crema valve 21. At the crema valve 21 the gas is injected through the nozzle into the crema chamber and mixed with the coffee flowing out of the brewing unit 11. Through a dosing device 37, which can activate and/or deactivate the pump 29 as required, the quantity of the gas injected into the crema chamber, which is injected into the coffee, is determined.

Alternatively to the pump 29 a pressure vessel with a controllable valve and/or a controllable throttling organ can also be used. Here, the controllable valve is adjusted (e.g. opened or closed) by the dosing device 37 as required or the throttling organ of the dosing device 37 is suitably adjusted as required. A combination is also possible for example a pump 29 can be employed together with a valve or a throttling organ and/or a pressure vessel. Accordingly, the dosing device 37 comprises a device for activating and/or deactivating the respective pump 29 and/or a device for adjusting the respective controllable valve and/or a device for adjusting the respective controllable throttling organ.

In a simple embodiment, ambient air for example is pressurized in a hose pump or a piston pump and directly injected into the crema chamber. The pump 29 in each case is activated through the dosing device 37 exactly when the gas is to be injected into the crema chamber. For example by changing an electric output supplied to the pump 29 the pressure generated by the pump 29 or the gas quantity can be changed.

It is also possible to obtain a coffee beverage without additionally injecting gas into the crema chamber. This means only a minimum quantity of crema is created by the crema valve 21. In this case the pump need not be supplied with electric energy. The injection device 27 and the pump 29 have to sufficiently seal the pressure of the coffee which flows out of the brewing unit 11 present in the crema chamber, so that flowing-out of the coffee into the injection device 27 is prevented. Accordingly, the injection device 27 is to be designed in such a manner that it is capable of sealing the pressure in the crema chamber without consuming energy. In addition, a controllable valve can also be employed near the nozzle which prevents the return flow of coffee from the crema chamber into the gas hose 28. Alternatively, the gas hose 28 can also be crimped or closed in order to prevent a flow of liquid through the gas hose.

As already mentioned, a pressure vessel can also be employed instead of the pump 29 which for example is filled up at a location which is distant from the brewing device 10. The pressure vessel in this case can be filled with a gas such as for example carbon dioxide $CO_2$, oxygen $O^2$ or for example a flavouring. The pressure vessel can also be filled through the pump 29 and serve as storage unit for compressed air. For dosing the gas injection, a controllable valve is arranged on the pressure bottle or integrated in a connecting line for the gas between the pressure bottle and the crema chamber. Thus the quantity of the injected gas and the time of the start of the gas injection as well as the respective duration of the gas injection can be changed as required.

Figure 2:
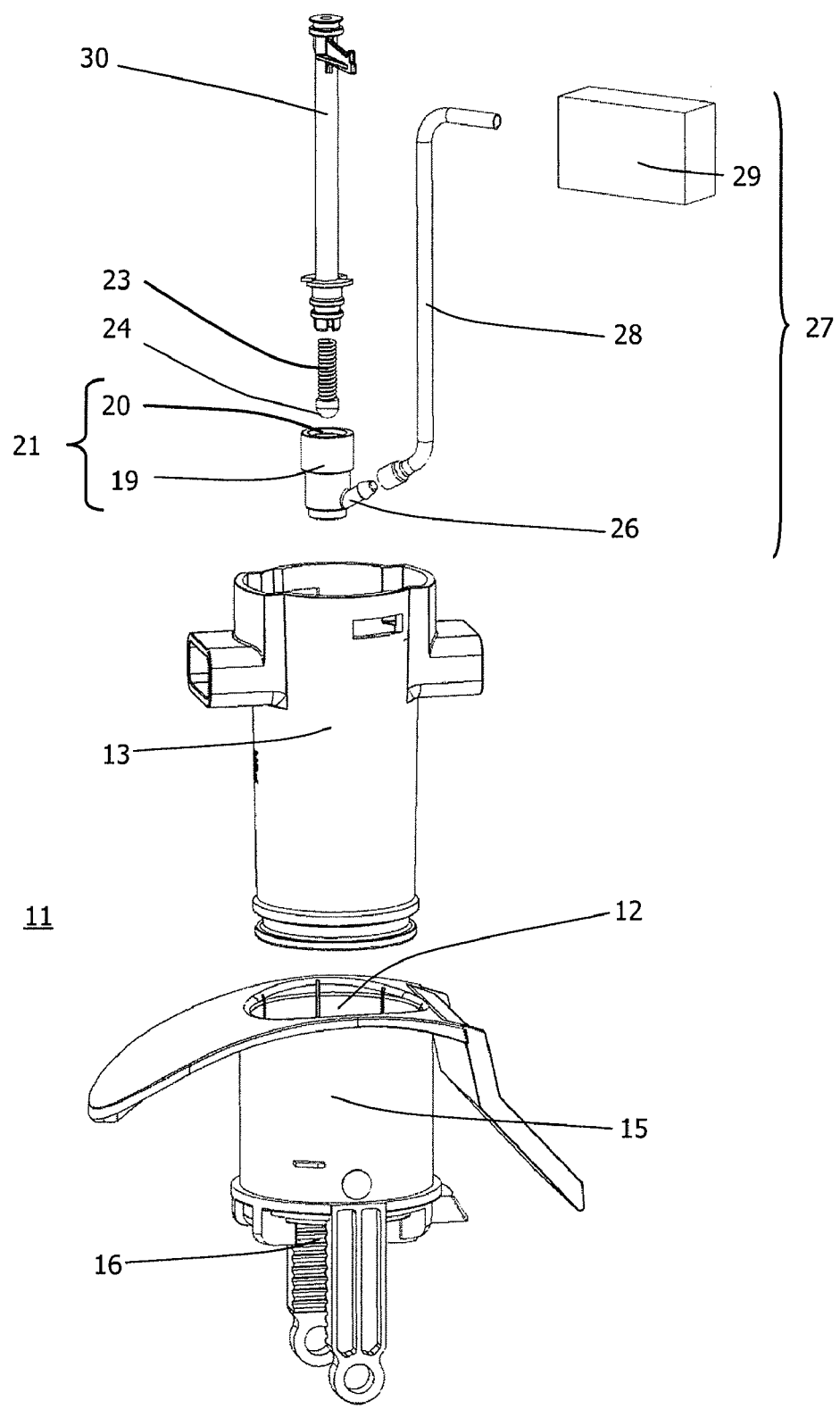
FIG. 2 is an exploded view of the brewing unit according to FIG. 1 with the crema valve and an injection device.

FIG. 2 shows an exploded view of the brewing unit 11 with crema valve 21 and the injection device 27. The crema valve 21 is connected with the pump 29 through the gas hose 28. The gas hose 28 is connected to the nozzle 26 of the crema valve 21. The crema valve 21 comprises a valve housing 19, in whose interior a crema chamber 20 is formed, wherein a closing plug 24 is lowered in the crema chamber 20. The closing plug 24 is pressed down by a compression spring 23 which is in contact with an end of a liquid line 30.

The crema valve 21 is integrated in a brewing plunger 13, which is pushed into a brewing cylinder 15. Through the pushing together of brewing plunger 13 and brewing cylinder 15 a brewing chamber 12 is created in which the coffee is brewed. Following the brewing process, water is extracted from the coffee powder residue that remains after the brewing process in that the brewing plunger 13 is pushed into the brewing cylinder 15. The coffee residue is then ejected from the brewing cylinder 15 into a residue container by an ejector piston 16. After this, the brewing device is ready for a further coffee brewing process.

Figure 3:
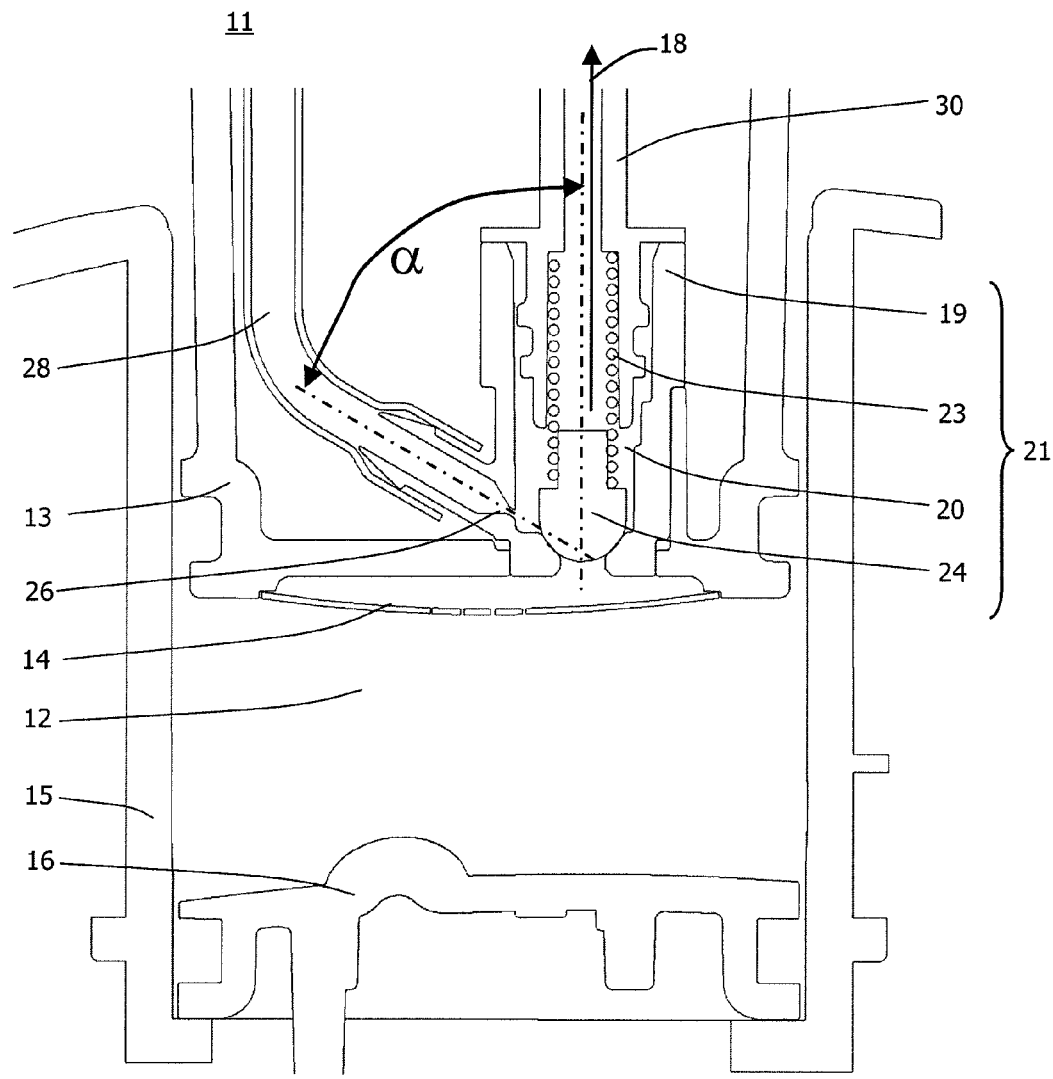
FIG. 3 is a lateral view of the brewing unit according to FIG. 2 with the crema valve and the injection device.

FIG. 3 shows a lateral view of the brewing unit 11 with the crema valve 21 and the injection device. During the brewing process coffee powder is brewed in the brewing chamber 12 with hot water. The water flows in for example from the bottom of the brewing chamber 12. Even through the brewing process, the formation of the crema can be influenced for example through pre-brewing, as well as brewing temperature and brewing pressure. The brewed coffee water flows through a metal sieve 14, which is attached to the brewing plunger 13 to the crema valve 21. The metal sieve 14 prevents the outflow of coffee powder from the brewing chamber 12.

The brewing process takes place under pressure. The compression spring 23 in the crema valve 21 has to be suitably dimensioned so that the closing plug 24 only lets the brewed coffee flow out of the brewing chamber 12 into the crema chamber 20 of the crema valve 21 at corresponding pressure. Through the shape of the closing plug 24 and the high pressure with which the coffee flows out of the brewing chamber 12, swirls develop along the surface of the closing plug 24 and the crema valve 21. Through the expansion and the swirling the crema is created in the coffee. After this, the coffee flows through the liquid line 30 to the coffee outlet 31.

The injection device 27 is fastened to the crema valve 21. By means of the injection device 27 the gas can be injected into the crema chamber 20 through a nozzle 26. The nozzle 26 preferentially has a diameter of approximately 0.5 mm. Here, the gas is injected into the coffee that flows out of the brewing chamber 12. It has proved practical if the nozzle 26 on the crema valve 21 near the closing plug 24 is arranged at an angle $\alpha$ between 10° and 170° with respect to the flow direction 18 of the coffee that flows out of the brewing chamber 12 (the flow direction is marked by an arrow provided with a reference symbol 18 in FIG. 3). Furthermore, it has proved particularly advantageous if the nozzle 26 is arranged at an angle α between 10° and 90° against the flow direction 18 of the coffee that flows out of the brewing chamber 12. As a result, the intermixing of the gas and the coffee is optimised, as a result of which a large quantity of small bubbles are created. These small bubbles form the fine-pored froth, the crema.

Dependent on various parameters such as for example the quantity of gas injected into the crema chamber 20, the pressure of the injected gas and the time at which the gas injection commences, a different type and quantity of crema is created.

Through a specification of the parameters gas quantity and gas pressure as a function of time a profile is defined. The profile is assigned to a crema which is predetermined in type and quantity. In a memory (not shown in the figures) various profiles can be stored. Such a memory can for example be an electronic memory, wherein it is practical to assign the memory to the respective control unit for controlling the brewing device 10 so that the stored profiles are accessible for the control unit. Through various profiles a crema corresponding to the regional customs can be created for a certain coffee beverage. The parameters of a profile can for example be preset by the manufacturer or an operator of the brewing device 10. Furthermore, one or a plurality of profiles can be additionally stored for the user of the brewing device depending on his personal taste or set by the user upon coffee beverage drawing.

In order to prevent faults in the brewing device 10 and to create a coffee beverage of high quality the brewing device 10 requires certain care. By injecting the gas in the crema valve 21 after the drawing of the coffee beverage residual water, which remains after the brewing process because of design features, can be emptied from the crema valve 21 and the liquid line 30 and the coffee outlet 31. The removal of the residual water from the brewing device 10 through the injection of the gas into the crema chamber 20 can also take place after a cleaning process. It is likewise possible that the parameters gas quantity and gas pressure are preset as a function of time according to a certain profile, dependent on the type of cleaning.

Figure 4:
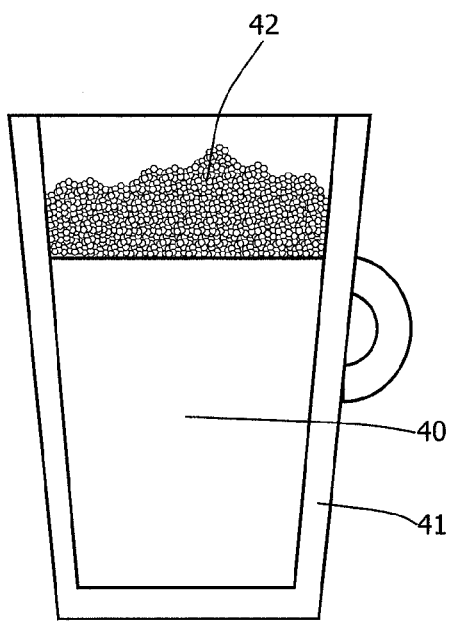
FIG. 4 is a lateral view of crema on a coffee beverage.
Figure 5:
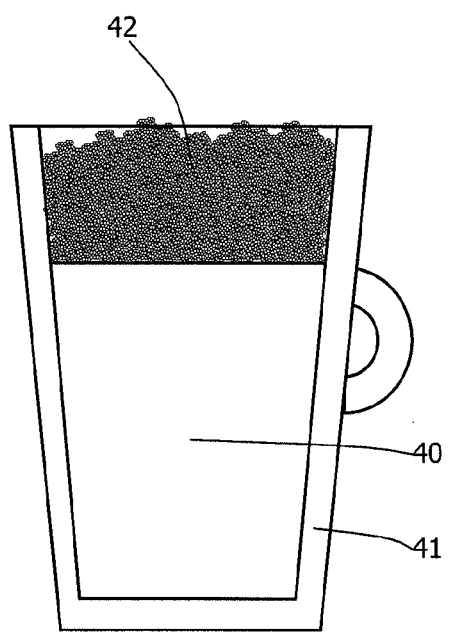
FIG. 5 is a lateral view of crema, similar to the crema shown in FIG. 4, however with more and more fine-pored crema.

FIGS. 4 and 5 each show a cup 41 with a coffee beverage 40 with different crema 42. In FIG. 4 a lesser quantity of crema 42 was created. The height of the crema 42 on the coffee beverage 40 and thus the entire volume of the crema 42 is therefore less than in FIG. 5. With the crema 42 in FIG. 5 the parameters for creating the crema 42 were preset so that compared with FIG. 4 a more fine-pored froth and thus a more fine-pored crema is created. Next to the quantity and the fine-porosity the crema 42 can also differ in its aroma and its colouration. For example addition of flavourings can influence the aroma or taste of the crema 42. By adding for example milk or various raw coffee types the colouration of the crema 42 can be additionally influenced.

The coffee beverage 40 mostly consists substantially of raw coffee brewed with water. In addition, milk, sugar or for example chocolate powder or liquid chocolate can be admixed to the brewed coffee. In this way, dependent on cultural and regional customs and the personal taste of the user of the brewing device a multiplicity of different coffee beverages can be prepared and a corresponding, individual crema 42 created in each case.

In order to make possible that the respective quantity of the gas, which is injected by means of the injection device 27 into the crema chamber 20, can be changed by a user if required the brewing device 10 comprises a user interface, not shown in FIG. 1-5) with the help of which the user can specify the quantity of the gas to be injected into the crema chamber 20 in each case. A keyboard, a touch-sensitive display, a rotary knob, a slide controller, a speech control or another interface suitable for entering data is suitable as user interface. In operation of the brewing device 10 the dosing device 37 ensures that with every following injection of the gas a quantity of the gas is injected in each case which corresponds to the quantity of the gas specified in each case.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A brewing device for creating coffee beverages comprising:
   a brewing unit;
   a crema valve; and
   an outlet;
   the brewing unit comprising a brewing chamber being configured to brew coffee with water under a brewing pressure;
   the crema valve comprising:
      a crema chamber;
      an inlet opening connecting the crema chamber with the brewing chamber;
      a closing plug for closing and opening the inlet opening being configured to enable an amount of brewed coffee to flow from the brewing chamber through the inlet opening into the crema chamber if the brewing pressure exceeds a predefined value;
   wherein
   the crema valve is designed in such a manner that the amount of brewed coffee is directed through the crema chamber to the outlet and is enabled to be swirled through in the crema chamber so that crema is created,
   wherein the brewing device comprises:
   an injection device for injecting a gas into the crema chamber and
   a dosing device for the dosing of the quantity of the gas injected into the crema chamber, the injection device comprising:
      a nozzle terminating in the crema chamber and
      a pump being arranged outside of the crema chamber for injecting the gas through the nozzle into the crema chamber and being configured to pressurize the gas so that the gas is enabled to be injected into the crema chamber when the amount of brewed coffee is directed through the crema chamber to the outlet,
      the dosing device being designed in such a manner that upon every injection of the gas a preset quantity of the gas is injected in each case wherein the preset quantity of the gas is a parameter that can be changed.

2. The brewing device according to claim 1, wherein the injection device comprises at least one of a controllable valve, and a controllable throttling organ for controlling injection of the gas.

3. The brewing device according to claim 1, wherein the dosing device comprises of a device configured for activating and deactivating the respective pump.

4. The brewing device according to claim 1, wherein the injected gas is air, $CO_2$, or flavouring.

5. The brewing device according to claim 1, wherein the quantity of the gas injected into the crema chamber is programmable or adjustable.

6. The brewing device according to claim 5, wherein the quantity of the gas injected into the crema chamber can be selected within preset limits.

7. The brewing device according to claim 1, wherein the nozzle is arranged at an angle between approximately 10° and 170° with respect to the flow direction of the coffee in the crema chamber.

8. The brewing device according to claim 7, wherein the injection device is configured to inject the gas at an angle between approximately 10° and 90° against the flow direction of the coffee.

9. The brewing device according to claim 8, wherein the nozzle terminates in the crema chamber adjacent to the inlet opening so that the injection device is configured to inject the gas adjacent to the inlet opening into the crema chamber.

10. The brewing device according to claim 2, wherein the dosing device comprises at least one of a device for adjusting the controllable valve and a device for adjusting the controllable throttling organ.

11. The brewing device according to claim 1, wherein the pump is a hose pump or a piston pump.

12. A brewing device for creating coffee beverages comprising:
  a brewing unit;
  a crema valve; and
  an outlet;
  the brewing unit comprising a brewing chamber being configured to brew coffee with water under a brewing pressure;
  the crema valve comprising:
    a crema chamber;
    an inlet opening connecting the crema chamber with the brewing chamber;
    a closing plug for closing the inlet opening being configured to enable an amount of brewed coffee to flow from the brewing chamber through the inlet opening into the crema chamber if the brewing pressure exceeds a predefined value;
  wherein the crema valve is designed in such a manner that the amount of brewed coffee is directed through the crema chamber to the outlet and is enabled to be swirled through in the crema chamber so that crema is created,
  wherein the brewing device comprises:
    an injection device for injecting a gas into the crema chamber and
    a dosing device for the dosing of the quantity of the gas injected into the crema chamber;
  the injection device comprising
    a nozzle terminating in the crema chamber and
    a pressure vessel containing the gas and being arranged outside of the crema chamber for injecting the gas through the nozzle into the crema chamber and being configured to provide the gas at a pressure being sufficient to enable the gas to be injected into the crema chamber when the amount of brewed coffee is directed through the crema chamber to the outlet;
  the dosing device being designed in such a manner that upon every injection of the gas a preset quantity of the gas is injected in each case wherein the preset quantity of the gas is a parameter that can be changed.

13. The brewing device according to claim 12, wherein the injection device comprises at least one of a controllable valve and a controllable throttling organ for controlling injection of the gas.

14. The brewing device according to claim 13, wherein the dosing device comprises at least one of a device for adjusting the controllable valve and a device for adjusting the controllable throttling organ.

15. The brewing device according to claim 12, wherein the injected gas is air, $CO_2$, or flavouring.

16. The brewing device according to claim 12, wherein the quantity of the gas injected into the crema chamber is programmable or adjustable.

17. The brewing device according to claim 12, wherein the nozzle is arranged at an angle between approximately 10° and 170° with respect to the flow direction of the coffee in the crema chamber.

18. The brewing device according to claim 17, wherein the injection device is configured to inject the gas at an angle between approximately 10° and 90° against the flow direction of the coffee.

19. The brewing device according to claim 18, wherein the nozzle terminates in the crema chamber adjacent to the inlet opening so that the injection device is configured to inject the gas adjacent to the inlet opening into the crema chamber.

* * * * *